(12) United States Patent
Kang

(10) Patent No.: US 8,464,146 B2
(45) Date of Patent: Jun. 11, 2013

(54) IMAGE FORMING SYSTEM INCLUDING AN IMAGE FORM APPARATUS, AND METHOD TO PROVIDE LOCAL USER INTERFACE USING THE SAME

(75) Inventor: Soo-young Kang, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 182 days.

(21) Appl. No.: 12/825,910

(22) Filed: Jun. 29, 2010

(65) Prior Publication Data

US 2011/0154227 A1  Jun. 23, 2011

(30) Foreign Application Priority Data

Dec. 17, 2009 (KR) .................. 10-2009-0126054

(51) Int. Cl.
  *G06F 17/28*  (2006.01)
(52) U.S. Cl.
  USPC .......................................................... 715/234
(58) Field of Classification Search
  USPC .......................................................... 715/234
  See application file for complete search history.

(56) References Cited

U.S. PATENT DOCUMENTS

| | | | |
|---|---|---|---|
| 2003/0011633 A1* | 1/2003 | Conley et al. | 345/762 |
| 2004/0216058 A1* | 10/2004 | Chavers et al. | 715/810 |
| 2004/0261010 A1 | 12/2004 | Matsuishi | |
| 2008/0091800 A1 | 4/2008 | Sorrentino et al. | |
| 2008/0270911 A1* | 10/2008 | Dantwala et al. | 715/741 |
| 2009/0257085 A1 | 10/2009 | Kondo | |

FOREIGN PATENT DOCUMENTS

EP  1874027  1/2008

OTHER PUBLICATIONS

Extended European Search Report dated Jan. 30, 2013 issued in EP Application No. 10192575.8.

* cited by examiner

Primary Examiner — Laurie Ries
Assistant Examiner — Tionna Smith
(74) Attorney, Agent, or Firm — Stanzione & Kim, LLP

(57) ABSTRACT

A method to provide a local user interface using an image forming apparatus including storing at least one of at least one first web application corresponding to each function of the image forming apparatus and a second web application provided by a third party, receiving a request for access to a local user interface from the at least one printing control apparatus, and identifying whether to display the at least one web application having an individual context, generating the local user interface according to the identification results, providing the printing control apparatus with the generated local user interface, and independently driving the web application of the image forming apparatus according to a web application selected by the printing control apparatus. Accordingly, a plurality of web applications can be controlled independently, so the user's convenience can be improved.

17 Claims, 17 Drawing Sheets

IMAGE FORMING SYSTEM INCLUDING AN IMAGE FORM APPARATUS, AND METHOD TO PROVIDE LOCAL USER INTERFACE USING THE SAME

CROSS-REFERENCE TO RELATED APPLICATIONS

This application claims priority under 35 U.S.C. §119 (a) from Korean Patent Application No. 10-2009-0126054, filed on Dec. 17, 2009, in the Korean Intellectual Property Office, the disclosure of which is incorporated herein by reference in its entirety.

BACKGROUND

1. Field of the Invention

The present general inventive concept relates to an image forming apparatus and a method to provide a local user interface using the same. More particularly, the present general inventive concept relates to an image forming apparatus to provide web content using a web application, and a method to provide a local user interface using the same.

2. Description of the Related Art

Image forming apparatuses generate, print, receive, and transmit image data, which include, among other devices, printers, scanners, copiers, fax machines, and multifunction peripherals incorporating the functions of the aforementioned devices.

Recently, an image forming apparatus which provides a user interface (UI) screen of the image forming apparatus as a web page has been introduced due to development of web technology.

A web server included in the image forming apparatus generates the UI screen as a web page and displays the generated UI screen using a web browser.

Accordingly, an external device having a web browser accesses the web server of the image forming apparatus so as to identify and display the UI screen.

However, when the UI screen of the image forming apparatus is displayed using the web browser in this conventional way, it takes a long time to load web content to be displayed on the UI screen and it is difficult to provide a UI screen reflecting the user's preference.

SUMMARY

The present general inventive concept provides an image forming apparatus which constitutes a user interface screen using a plurality of web applications, and a method to provide a local user interface using the same.

Additional features and utilities of the present general inventive concept will be set forth in part in the description which follows and, in part, will be obvious from the description, or may be learned by practice of the general inventive concept.

Embodiments of the present general inventive concept may be achieved by providing an image forming apparatus which is connected to at least one printing control apparatus including a second display unit implemented as a web browser, the image forming apparatus including a first display unit to display each function of web content through a web browser, a storage unit to store at least one of at least one first web application corresponding to each function of the image forming apparatus and a second web application provided by a third party, a web server to receive a request for access to a local user interface from the at least one printing control apparatus, and a control unit to identify whether to display the at least one web application having an individual context and to generate the local user interface according to the identification results, wherein the web server provides the printing control apparatus with the generated local user interface, and wherein according to a web application selected by the printing control apparatus, the control unit independently drives the web application.

The local user interface provided to the second display unit of the printing control apparatus may be different from the local user interface provided to the first display unit of the image forming apparatus.

The at least one web application may have an independent Uniform Resource Locator (URL).

The at least one web application may include a web application displaying a copy icon, a web application displaying a scan icon, a web application displaying a fax icon, a web application displaying a universal serial bus (USB) icon, a web application displaying a machine setting icon, a web application displaying a main page including the icons, and a web application provided by a third party.

The web application displaying the main page may provide link information regarding the web applications displaying the icons.

If a URL of one of the at least one web application is input into the web browser of the printing control apparatus, the control unit may drive a web application corresponding to the input URL.

The request for access may include a URL of the at least one web application or a parameter set to perform a specific function together with the URL.

Embodiments of the present general inventive concept may be achieved by providing a method to provide a local user interface using an image forming apparatus which may include a first display unit to display each function of web content through a web browser and is connected to at least one printing control apparatus including a second display unit implemented as a web browser, the method may include storing at least one of at least one first web application corresponding to each function of the image forming apparatus and a second web application provided by a third party, receiving a request for access to a local user interface from the at least one printing control apparatus, identifying whether to display the at least one web application having an individual context, generating the local user interface according to the identification results, providing the printing control apparatus with the generated local user interface, and independently driving the web application of the image forming apparatus according to a web application selected by the printing control apparatus.

The local user interface provided to the second display unit of the printing control apparatus may be different from the local user interface provided to the first display unit of the image forming apparatus.

The at least one web application may have an independent Uniform Resource Locator (URL).

The at least one web application may include a web application displaying a copy icon, a web application displaying a scan icon, a web application displaying a fax icon, a web application displaying a universal serial bus (USB) icon, a web application displaying a machine setting icon, a web application displaying a main page including the icons, and a web application provided by a third party.

The web application displaying the main page may provide link information regarding the web applications displaying the icons.

In the independently driving function of the web application of the image forming apparatus, if a URL of one of the at least one web application is input to the web browser of the printing control apparatus, a web application corresponding to the input URL may be driven.

The request for access may include a URL of the at least one web application or a parameter set to perform a specific function together with the URL.

Embodiments of the present general inventive concept may be achieved by providing an image forming apparatus which may connect to at least one printing control apparatus including a second display unit implemented as a web browser, the image forming apparatus may include a first display unit to display each function of web content through a web browser, a storage unit to store at least one web application corresponding to each function of the image forming apparatus, a web server to receive a request for direct access to the at least one web application from the at least one printing control apparatus, and a control unit to identify whether to display the at least one web application having an individual context and to generate the local user interface according to the identification results, wherein the web server provides the printing control apparatus with the at least one web application.

The request for direct access may use a bookmark of the second display unit, a Uniform Resource Locator (URL) of one of the at least one web application, and a parameter set to perform a specific function together with the URL.

Embodiments of the present general inventive concept further provide for an image forming system including at least one printing control apparatus including a printing control interactive web display, and an image forming apparatus including a display unit to display at least one stored network application related to an image forming apparatus function through a web browser, a network server to receive a request for direct access to the at least one stored network application without passing through a main network application from the at least one printing control apparatus, and a control unit to determine whether to generate the at least one stored network application for the at least one printing control apparatus, such that the network server provides the at least one printing control apparatus with an application capable of displaying the generated at least one stored network application.

Embodiments of the present general inventive concept further provide for a method of providing at least one web application from an image forming apparatus to at least one peripheral device, the method including storing at least one web application corresponding to an image forming apparatus function and at least one third party web application, receiving a remote request for access to a local user interface from the at least one peripheral device, determining whether to grant the at least one peripheral device access to the local user interface based on an identification code and password input at the at least one peripheral device, and independently controlling the at least one web application while generating a local user interface to display on a display unit of the at least one peripheral device.

BRIEF DESCRIPTION OF THE DRAWINGS

Embodiments of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
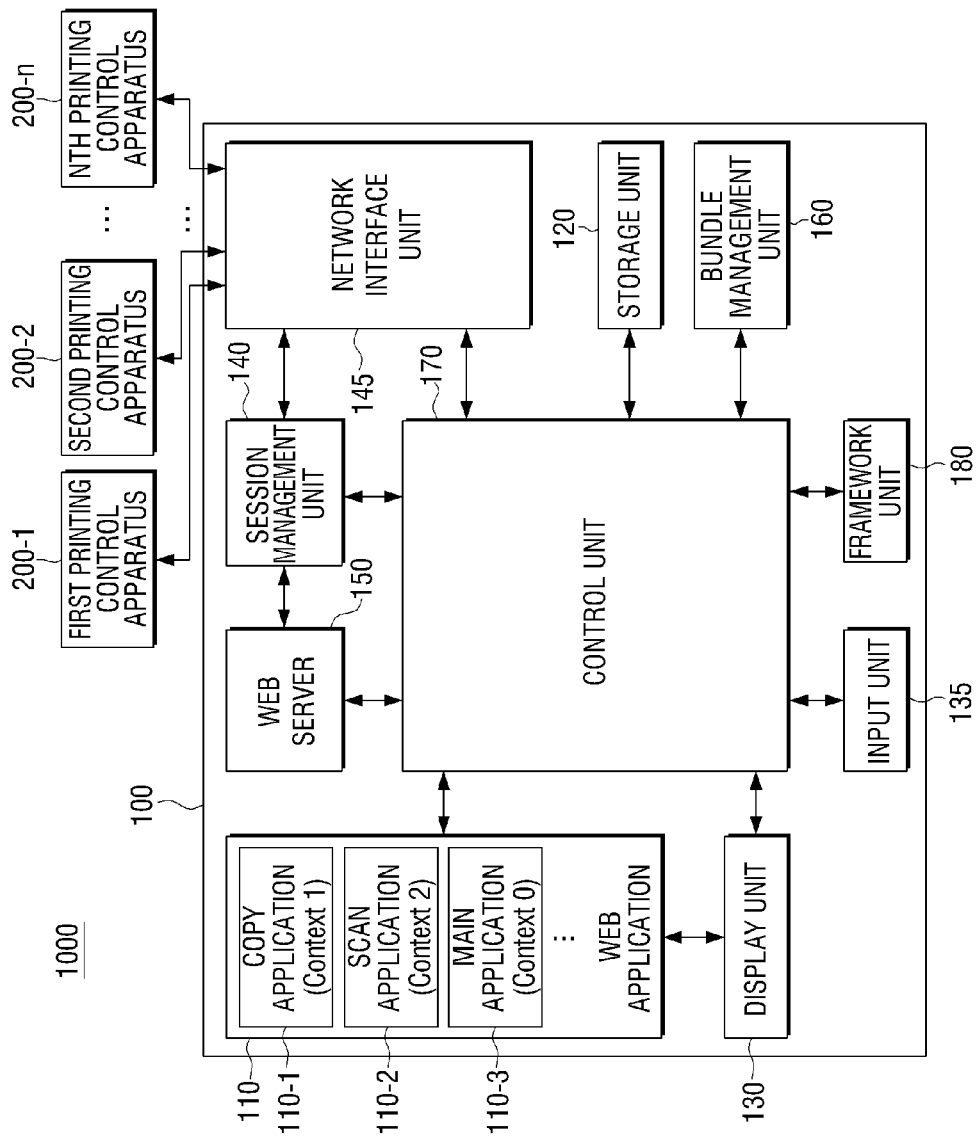
FIG. 1 is a schematic diagram illustrating a configuration of an image forming system according to an exemplary embodiment of the present general inventive concept.

Reference will now be made in detail to the exemplary embodiments of the present general inventive concept, examples of which are illustrated in the accompanying drawings, wherein like reference numerals refer to like elements throughout. The exemplary embodiments are described below in order to explain the present general inventive concept by referring to the figures FIG. 1 is a schematic diagram illustrating a configuration of an image forming system 1000 according to an exemplary embodiment of the present general inventive concept. Referring to FIG. 1, the image forming system 1000 may include an image forming apparatus 100 and at least one printing control apparatus 200-1, 200-2, . . . , and 200-n.

The image forming apparatus 100 may be a printer, a scanner, a copier, a fax machine, or a multifunction peripheral incorporating the functions of the aforementioned devices.

The at least one printing control apparatus 200-1, 200-2, . . . , and 200-n may be a host computer or a mobile device, such as a laptop personal computer, netbook computer, mobile phone, a personal digital assistant (PDA), and a portable multimedia player (PMP), which have an engine capable of remotely transmitting various commands to the image forming apparatus 100. The at least one printing control apparatus 200-1, 200-2, . . . , and 200-n may be referred to as various terms such as a host terminal and a host device. The printing control apparatus 200-1, 200-2, ..., and 200-n may include a display unit (not illustrated) which may be referred to as a second display unit.

Note, data transmission between the at least one printing control apparatus 200-1, 200-2, ..., and 200-n and the image forming apparatus 100 can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

The image forming apparatus 100 may include at least one web application 110, a storage unit 120, a display unit 130, an input unit 135, a session management unit 140, a network interface unit 145, a web server 150, a bundle management unit 160, a control unit 170, and a framework unit 180.

The at least one web application 110 may constitute web content which may be displayed on a user interface (UI) screen of the image forming apparatus 100 implemented as a web browser. As illustrated in FIG. 1, a copy application 110-1 to perform copying, a scan application 110-2 to perform scanning, and a main application 110-3 to perform a function of a main screen of the UI screen may be displayed on the UI screen of the display unit 130.

Each of the web applications 110-1, 110-2, and 110-3 may be formed in a bundle, and have an independent Uniform Resource Locator (URL). In addition, each of the web applications 110-1, 110-2, and 110-3 may have individual context and may independently respond to a request to access the web application.

In this case, the at least one web application 110 may be displayed as an icon on the UI screen of the display unit 130. In addition, since the UI screen may provide web content as a web page on the web browser, a main screen (i.e. a default screen) displayed on the UI screen may be referred to as a main page (or a default page) when the image forming apparatus 100 is powered on.

The storage unit 120 may store the at least one web application 110. For example, the storage unit 120 may store web applications which constitute the main screen of the display unit 130. In addition, the storage unit 120 may store web applications which constitute the UI screen changed in accordance with the user's preference, or store web applications developed by an open source developer (i.e. a third party) to be added to the UI screen.

The display unit 130 may display web content through the web browser. More specifically, the display unit 130 may display functions of the web content through the web browser. For example, the display unit 130 may display the web content through a liquid crystal display (LCD) window mounted on a specific area of the image forming apparatus 100. The display unit 130 may be referred to as a first display unit.

The web content may constitute the whole or a portion of the screen of the display unit 130. The web content may include text, an image, a movie, a tag, and a combination of the aforementioned items. Since the screen of the display unit 130 may be displayed as a web page, the web content may also be displayed as a web page. Since the web content may constitute the UI screen of the display unit 130, the web content may be UI content. In addition, the web application may be displayed as web content which constitutes a web page on the display unit 130.

The web application may include a web application displaying a copy icon, a web application displaying a scan icon, a web application displaying a fax icon, a web application displaying a universal serial bus (USB) icon, a web application displaying a machine setting icon, a web application displaying the main page including main page icons, and a web application provided by a third party.

The web application displaying the main page may provide link information regarding the web applications displaying the icons.

The browser may be Microsoft Internet Explorer (MSIE), Firefox, Poera, Chrome, Safari, Maemo, Android, or LiMo, and may be implemented using a web-based language such as Hyper Text Markup Language (HTML), Extensible Markup Language (XML), JSP, ASP, PHP, Flex, and JavaFX.

The input unit 135 may receive a user command corresponding to a key input on an operating panel by the user. The input unit 135 may receive a user command using a touch screen function provided by the display unit 130. If a user command is input, an event to independently drive at least one web application may occur.

The session management unit 140 may manage a web browser of the printing control apparatus 200-1, 200-2, ..., and 200-n when the at least one printing control apparatus 200-1, 200-2, ..., and 200-n accesses the image forming apparatus 100. The session management unit 140 may determine a connection state of the accessed browser and whether to allow access to the image forming apparatus 100.

The network interface unit 145 may transmit data to and receive data from the at least one printing control apparatus 200-1, 200-2, ..., and 200-n through a network interface unit (not illustrated) of the at least one printing control apparatus 200-1, 200-2, ..., and 200-n. In addition, the network interface unit 145 may receive a request for access to a local user interface from the at least one printing control apparatus 200-1, 200-2, ..., and 200-n. More specifically, the web server 150 may receive a request for access to the main page which is one of the applications of the image forming apparatus 100. In addition, the web server 150 may receive a request for direct access to a page connected through the main page, that is, a web application providing a detailed function of a web application provided by the main page.

In addition, the request for access input to the web server 150 may include a URL of at least one web application, and a parameter set to perform a specific function together with the URL.

The web server 150 may provide the printing control apparatus 200 with a generated local user interface. More specifically, the web server 150 may provide the printing control apparatus 200 with an application displaying the generated main page or a web application providing each function of the main page.

The image forming apparatus 100 may receive a request for access through the network interface unit 145, the session management unit 140, and the web server 150 in sequence, and may transmit data such as a local user interface to at least one printing control apparatus 200-1, 200-2, . . . , and 200-n through the web server 150, the session management unit 140, and the network interface unit 145 in sequence.

In addition, unlike FIG. 1, the positions of the session management unit 140 and the web server 150 are exchangeable, so the image forming apparatus 100 may receive a request for access through the network interface unit 145, the web server 150, and the session management unit 140 in sequence, and may transmit data, such as a local user interface, to at least one printing control apparatus 200-1, 200-2, . . . , and 200-n through the session management unit 140, the web server 150, and the network interface unit 145 in sequence.

Furthermore, the session management unit 140 and the network interface unit 145 may be included in the web server 150 as function modules.

The bundle management unit 160 may identify whether or not at least one web application 110 can be applied to the image forming apparatus 100. A web application 110 may be produced by a manufacturer of the image forming apparatus 100 or by a third party based on open source software. Accordingly, when a web application produced by a third party is applied to the image forming apparatus 100, the bundle management unit 160 may check compatibility with the web application. More specifically, the bundle management unit 160 may check whether the internal structure of a bundle can be recognized by the image forming apparatus 100 or whether a bundle conflicts with other bundles.

The control unit 170 may control the overall operation of the image forming apparatus 100.

More specifically, the control unit 170 may identify whether to display at least one web application 110 having an individual context and generate a local user interface according to the identification results.

The control unit 170 may identify whether to display at least one web application 110 having individual context according to whether or not the at least one web application 110 operates or uses at least one of preset information corresponding to user information of the at least one printing control apparatus 200-1, 200-2, . . . , and 200-n.

More specifically, according to whether or not the at least one web application 110 operates normally, all the web applications 110-1, 110-2, . . . , and 110-n may be displayed on the first display unit 130 or only a portion of the web applications may be displayed on the first display unit 130. Accordingly, a local user interface provided to the second display unit (not illustrated) of the printing control apparatus 200-1, 200-2, . . . , and 200-n may be different from a local user interface displayed on the first display unit 130 of the image forming apparatus 100.

In addition, for example, when user A of at least one printing control apparatus 200-1, 200-2, . . . , and 200-n accesses the image forming apparatus 100 using an identification (ID) and a password, if information that the UI screen of the display unit 130 of the image forming apparatus 100 is constituted only by a web application displaying a copy icon and a web application displaying a scan icon according to user A's preference is preset, it can be determined that at least one web application is displayed based on the pre-set information in the storage unit 120.

In addition, if a URL of one of the at least one web application 110 is input in the web browser of the printing control apparatus 200, the control unit 170 may generate a web application having the input URL.

The control unit 170 may independently drive a web application of the image forming apparatus 100 according to the web application selected by the at least one printing control apparatus 200-1, 200-2, . . . , and 200-n.

The control unit 170 may independently control and drive a plurality of web applications constituting web content according to occurrence of an event that the image forming apparatus 100 is powered on or that a user command is input through the input unit 135.

The control unit 170 may control the display unit 130 to display web content corresponding to at least one of a plurality of web applications according to the user command.

Accordingly, independent control of each web application is enabled, thus improving userconvenience.

In addition, the control unit 170 may control actual operations such as printing, copying, and scanning. More specifically, the control unit 170 may drive a web application of the image forming apparatus 100 according to the web application selected by the at least one printing control apparatus 200-1, 200-2, . . . , and 200-n.

The framework unit 180 may control enabling or disabling of each web application 110. In addition, the framework unit 180 may control at least one web application 110 according to a request for access input through the web server 150.

As described above, if the at least one printing control apparatus 200-1, 200-2, . . . , and 200-n accesses a web application displaying the main page, the image forming apparatus 100 according to the exemplary embodiment of the present general inventive concept may provide the at least one printing control apparatus 200-1, 200-2, . . . , and 200-n with the web application itself displaying the main page or a modified web application displaying the main page.

In addition, if the at least one printing control apparatus 200-1, 200-2, . . . , and 200-n does not access the web application displaying the main page but directly accesses a web application displaying detailed functions of the main page, an image forming apparatus 100, according to another exemplary embodiment of the present general inventive concept, may provide the at least one printing control apparatus 200-1, 200-2, . . . , and 200-n with the web application itself displaying detailed functions of the main page or a modified web application displaying detailed functions of the main page.

More specifically, the image forming apparatus 100 may include a first display unit 130, a storage unit 120, a web server 150, and a control unit 170.

The first display unit 130 may display each function of web content through a web browser.

The storage unit 120 may store at least one web application 110 corresponding to each function of the image forming apparatus 100.

The web server 150 may receive a request for direct access to at least one web application 110 from the at least one printing control apparatus. In addition, the web server 150 may provide the printing control apparatus 200-1, 200-2, . . . , and 200-n with at least one web application.

The control unit 170 may identify whether to display at least one web application 110 having an individual context and generate at least one web application 110 according to the identification results.

In this case, the request for direct access may use a bookmark of the second display unit (not illustrated) of the at least one printing control apparatus 200-1, 200-2, . . . , and 200-n, a URL of one of the at least one web application 110, or a parameter set to perform a specific function together with the URL.

An image forming apparatus 100 according to another exemplary embodiment of the present general inventive concept may include a storage unit 120 to store a plurality of web applications 110, a display unit 130 to display web content through a web browser, and a control unit 170 to independently control the plurality of web applications 110 constituting web content according to an occurrence of an event. In this case, the plurality of web applications 110 each has an individual URL and individual context.

Figure 2A:
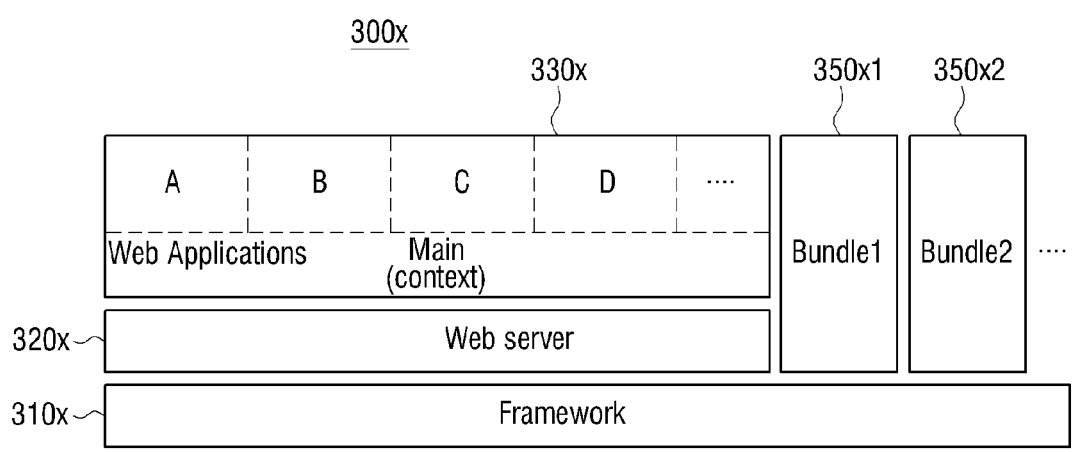
FIGS. 2A and 2B illustrate an operating principle of an image forming apparatus according to an exemplary embodiment of the present general inventive concept.
Figure 2B:
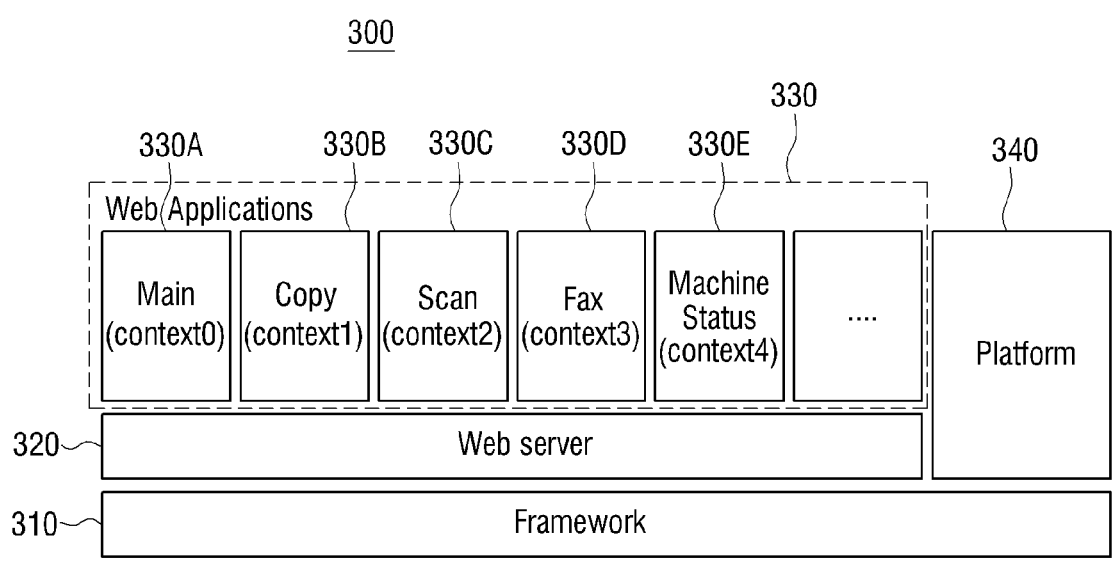

FIGS. 2A and 2B illustrate an operating principle of an image forming apparatus according to an exemplary embodiment of the present general inventive concept.

Referring to FIG. 2A, in a conventional image forming apparatus 300x, a main web application 330x, which is a web application displaying a main screen of a display unit, may be formed as a single application. Accordingly, the main web application may constitute a single context.

In the conventional image forming apparatus, the main web application may have a substructure including a plurality of contents.

Also, illustrated in FIG. 2A is a web server 320x and framework 310x, wherein the web server 320x operates based on the framework 310x. Further, Bundle1 350x1 and Bundle2 350x2 represent additional web applications.

If the single main web application includes all the contents, a large amount of memory may be used and the loading speed of the web application may be lowered, thereby affecting the performance of the image forming apparatus. In addition, when the user does not need various functions of the image forming apparatus, it may not be easy to reflect this requirement. Furthermore, it is not easy to add a web application produced by a third party.

FIG. 2B illustrates an operating principle of an image forming apparatus 300 according to an exemplary embodiment of the present general inventive concept. Components which are not necessary to describe the operating principle of an image forming apparatus 300 are omitted.

Referring to FIG. 2B, the image forming apparatus 300 may include a framework 310, a web server 320, a plurality of web applications 330, and a platform 340.

More specifically, in the image forming apparatus 300, the web server 320 may operate based on the framework 310, the plurality of web applications 330 may operate based on the web server 320, and the platform 340 may operate based on the framework 310.

The framework 310 may control enabling or disabling of each of the plurality of web applications 330. In addition, the framework 310 may control the plurality of web applications 330 based on a user command input through the web server 320, and control the platform 340. The framework 310 may perform the same function as the control unit 170 illustrated in FIG. 1 or a main web application 330A.

The web server 320 may be connected to at least one user terminal (not illustrated) by receiving a URL.

The plurality of web applications 330 may be provided on the web server 320, and may operate individually.

The plurality of web applications 330 may each have individual context and may operate and respond independently according to the user command. In addition, the plurality of web applications 330 may each have an individual URL.

In the image forming apparatus 300, each web application 330A, 330B, 330C, 330D, and 330E on the web server 320 is formed in a separate bundle and has a individual context.

Accordingly, the user can selectively drive a desired web application from among the plurality of web applications and a time taken to load web content including at least one web application can be shortened. Also, the user can selectively and directly load web content corresponding to a specific web application and a specific function can be added when web content corresponding to a specific web application is loaded, so the user's convenience can be enhanced.

The platform 340 may control actual operations such as printing, copying, and scanning. For example, if a web application performing printing is selected by the at least one printing control apparatus 200-1, 200-2, . . . , and 200-n, the platform 340 may control a printing engine (not illustrated) to perform printing.

The platform 340 may be included in the control unit 170, as illustrated in FIG. 1. In this case, the control unit 170 can perform the control operation of the platform 340 as described above.

Alternatively, the platform 340 may be disposed separately from the control unit 170. In this case, the control unit 170 can perform all the operations of the platform 340 other than the control operation of the platform 340.

The storage unit 120, the display unit 130, the input unit 135, the session management unit 140, and the bundle management unit 160 may be provided on the web server 320, that is, on the same layer as the plurality of web applications 330.

Figure 3:
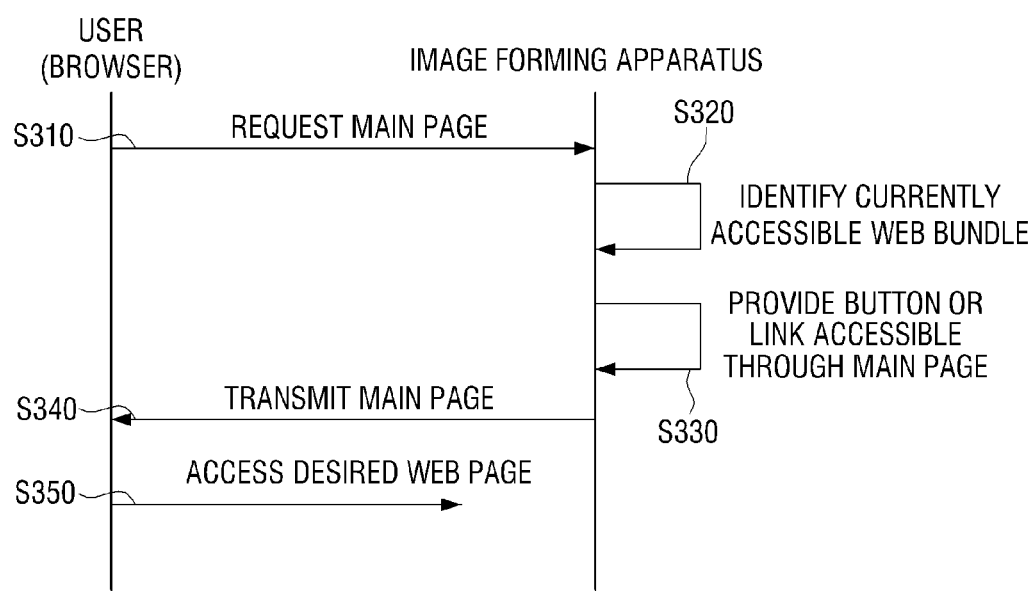
FIG. 3 illustrates an exemplary process in which a user accesses a multifunction peripheral according to an exemplary embodiment of the present general inventive concept.

FIG. 3 illustrates an example of a process in which the user accesses a multifunction peripheral according to an exemplary embodiment of the present general inventive concept. Referring to FIG. 3, in operation S310, the user may request a main page, that is, a main web application through the browser.

In operation S320, the image forming apparatus 100 may check currently accessible web bundles (i.e. a currently accessible web application). In operation S330, the image forming apparatus 100 may provide buttons or links which are accessible through the main page.

In operation S340, the main page may respond to the user's browser. In operation S350, the user's browser may access a desired web application (i.e. a desired bundle).

In this case, the user can access the specific image forming apparatus 100 using an ID and a password, and the image forming apparatus 100 can authenticate the user, that is, authenticate the printing control apparatus using well-known various algorithms.

Figure 4A:
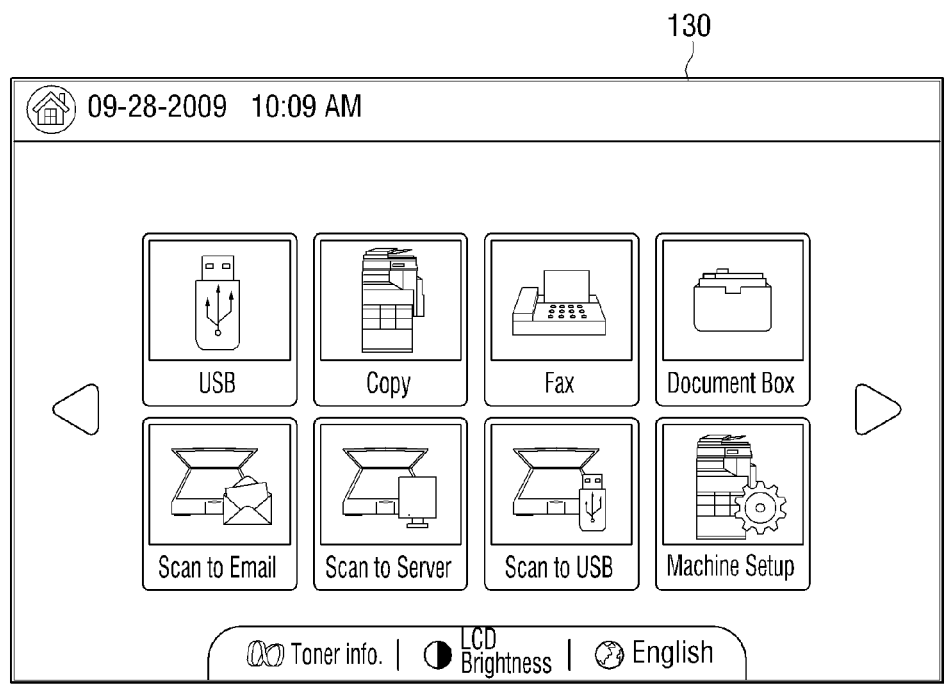
FIGS. 4A through 4C illustrate examples of a display unit.
Figure 4B:
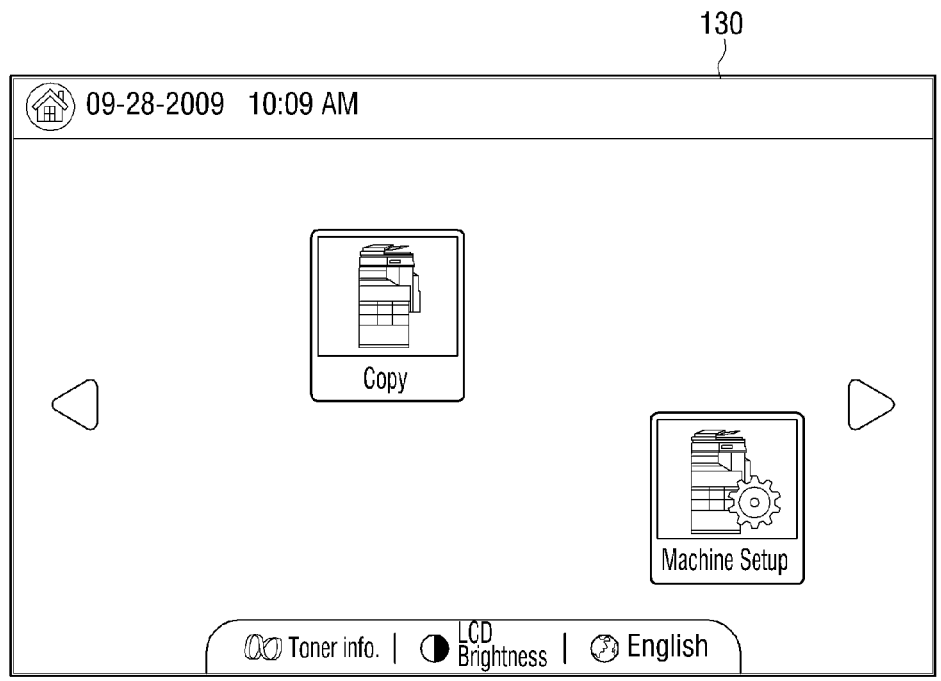
Figure 4C:
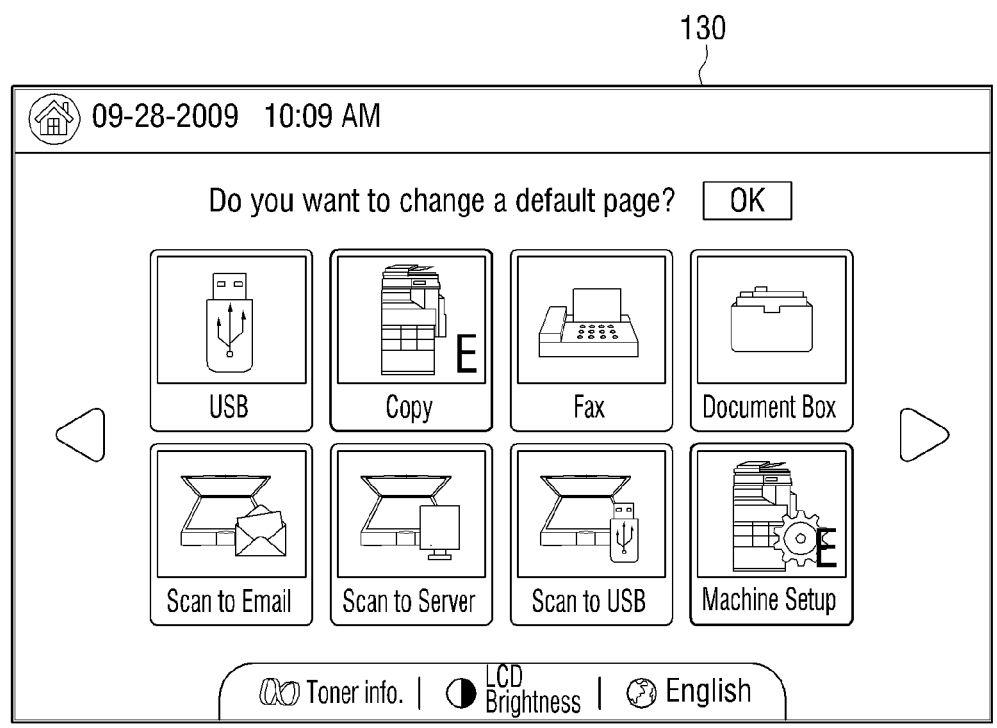

FIGS. 4A through 4C illustrate examples of a display unit 130. Hereinafter, only the display unit 130 of the image forming apparatus 100, that is, the first display unit is described, but the display unit of the printing control apparatus, that is, the second display unit (not illustrated) may also operate in the same manner as the first display unit.

Referring to FIG. 4A, the first display unit 130 may display a main page having icons such as USB, Copy, Fax, Document Box, Scan to Email, Scan to Server, Scan to USB, and Machine Setup, but the icons are not limited thereto.

In addition, the main page may provide link information regarding the icons. For example, if the Copy icon is selected from the main page, the display unit 130 can display web content providing a copying function, that is, a web page providing a copying function.

In addition, the display unit 130 may display web content for general settings, such as adjustment of brightness of an LCD window, check of the amount of toner, and selection of language, on the main page.

Referring to FIG. 4B, the display unit 130 may display the main page including the Copy icon and the Machine to Setup icon. That is, the main page may be generated to include most frequently used icons so as to correspond with the user's preference according to operation of the control unit 170 and may be stored in the storage unit 120.

The web applications displayed on the display unit 130 of the image forming apparatus 100 and the web applications displayed on a display unit (not illustrated) of the at least one printing control apparatus 200-1, 200-2, . . . , and 200-n are generally the same, and may be different, as illustrated in FIGS. 4A and 4C.

FIG. 4C illustrates an example of the display unit 130 to change the main page. Referring to FIG. 4C, the display unit 130 can display web content to change a default screen displayed through the web browser, that is, the main page.

For example, if the Copy icon and the Machine to Setup icon are selected, letter "E" is added to the Copy icon and the Machine to Setup icon so as to represent the enabled state of the Copy icon and the Machine to Setup icon. Subsequently, if the user presses an "OK" button to change the default page, the main page including only the Copy icon and the Machine to Setup icon may be displayed on the display unit 130 as illustrated in FIG. 4B.

Figure 5:
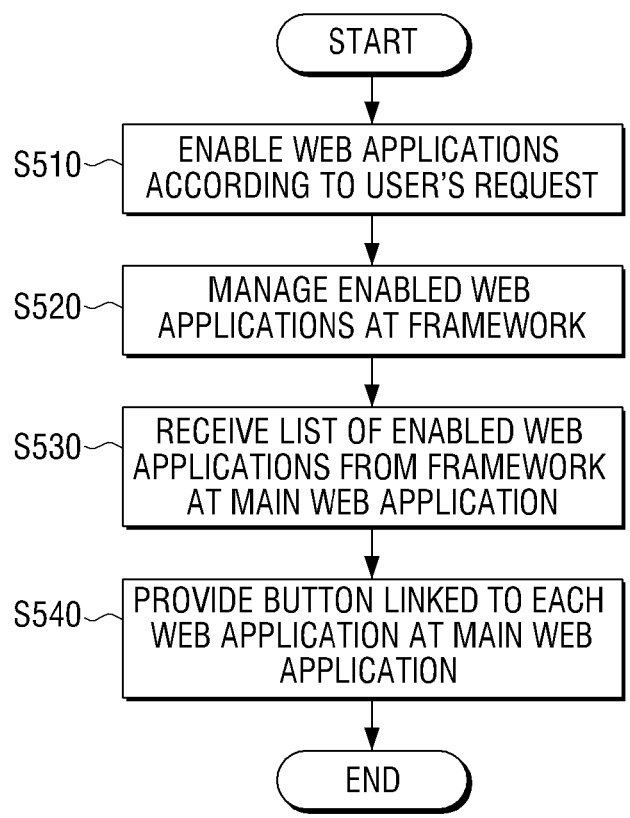
FIG. 5 is a flow chart illustrating a method to provide a local user interface according to an exemplary embodiment of the present general inventive concept.

FIG. 5 is a flow chart illustrating a method to provide a local user interface according to an exemplary embodiment of the present general inventive concept. Referring to FIG. 5, in operation S510, web applications may be enabled according to the user's request.

In operation S520, the framework unit 180 may manage the enabled web applications.

In operation S530, the main web application, that is, an application displaying web content of the main page may receive a list of enabled web applications from the framework unit 180.

In operation S540, the main web application may provide buttons linked to the respective web applications.

As a result, the display unit 130 may display web content having the preset default pages or display web applications changed by the user. In addition, the display unit 130 may provide links with each web application on the main page.

In addition, the printing control apparatus 200-1, 200-2, . . . , and 200-n may receive the web applications displayed on the display unit 130 of the image forming apparatus 100, and display the received web applications on the second display unit (not illustrated). Alternatively, the printing control apparatus 200-1, 200-2, . . . , and 200-n may receive web applications which are not the same as the web applications displayed on the display unit 130 of the image forming apparatus 100, and display the received web applications on the second display unit (not illustrated).

Figure 6:
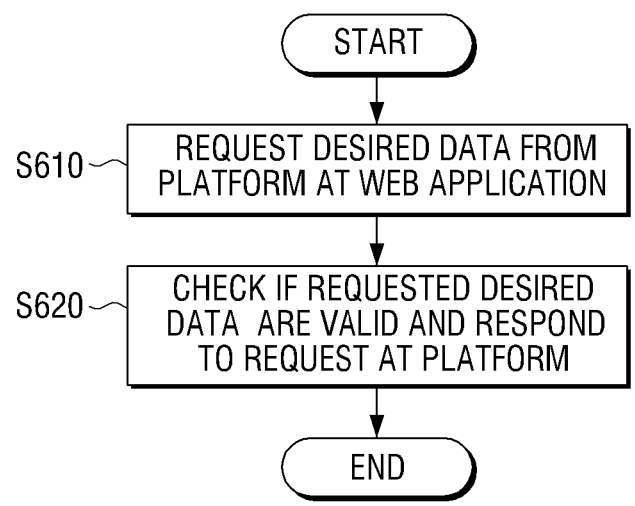
FIG. 6 is a flow chart illustrating a communication method between a platform and a web application according to an exemplary embodiment of the present general inventive concept.

FIG. 6 is a flow chart illustrating a communication method between a platform and a web application according to an exemplary embodiment of the present general inventive concept. Referring to FIG. 6, in operation S610, the web application may request desired data from the platform 340.

The desired data may indicate tray information of the image forming apparatus 100, toner information, data regarding constitution of the screen, and basic setting values.

In operation S620, the platform 340 may check if the requested desired data are valid and respond to the request.

Figure 7:
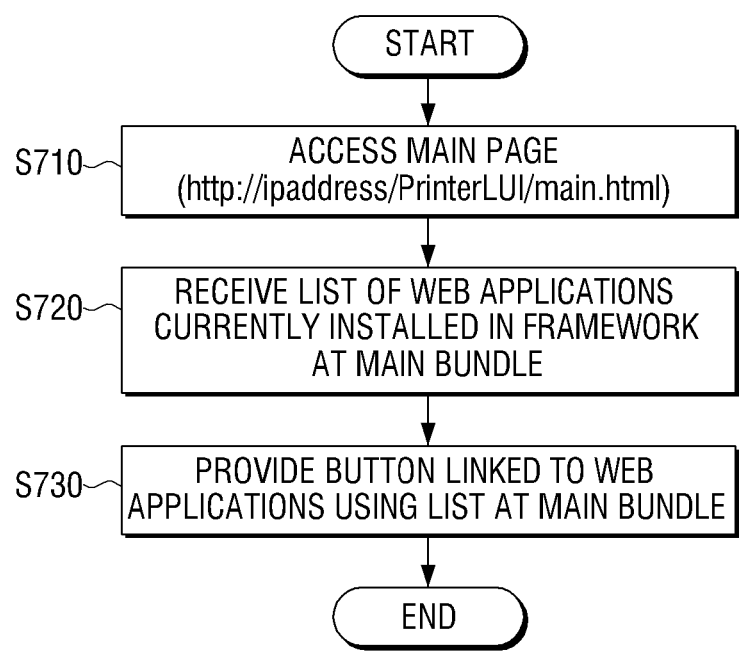
FIG. 7 is a flow chart illustrating a method to display a main web application according to an exemplary embodiment of the present general inventive concept.

FIG. 7 is a flow chart illustrating a method to display a main web application according to an exemplary embodiment of the present general inventive concept.

Referring to FIG. 7, in operation S710, at least one printing control apparatus 200-1, 200-2, . . . , and 200-n may access the main page of the image forming apparatus 100. For example, the at least one printing control apparatus 200-1, 200-2, . . . , and 200-n may access the main page having a URL of http://ipaddress/PrinterLUI/main.html.

In operation S720, the main bundle, that is, the main web application may receive a list of enabled web applications from the framework unit 180. The framework unit 180 may have information regarding enabled or disabled web applications in advance.

In operation S730, the main bundle may provide buttons linked to the web applications using the list of web applications from the framework unit 180.

Accordingly, the main bundle, that is, the main web application can provide link information regarding other web applications.

Alternatively, web content providing link information regarding other web applications may be implemented using a separate web application by the user.

Figure 8:
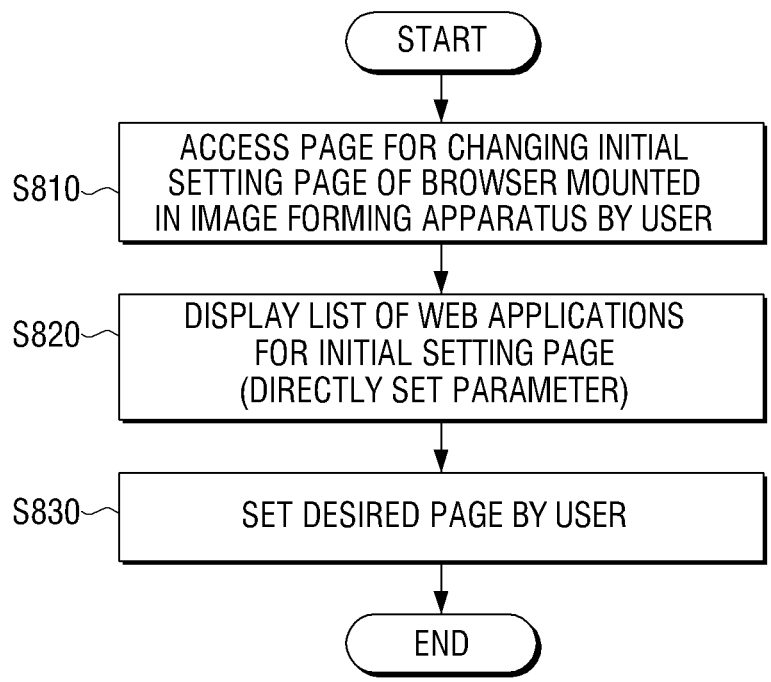
FIG. 8 is a flow chart illustrating a method to display a web application to change a default page according to an exemplary embodiment of the present general inventive concept.

FIG. 8 is a flow chart illustrating a method to display a web application to change a default page according to an exemplary embodiment of the present general inventive concept.

Referring to FIG. 8, in operation S810, the user may access a page to change an initial setting page of a browser mounted in the image forming apparatus 100. The user may access a UI screen of the image forming apparatus 100 from an external browser by directly inputting a URL of the initial setting page of the image forming apparatus 100.

A page to change the initial setting page, that is, a default page may be generated using a separate web application in advance and may be pre-stored in the storage unit 120.

In operation S820, a list of web applications for the initial setting page are displayed. A list of web applications for the initial setting page may be provided by selecting icons from the GUI screen, as illustrated in FIGS. 4A through 4C, or by the user directly inputting on the text screen.

In operation S830, the user may set a desired page.

Figure 9:
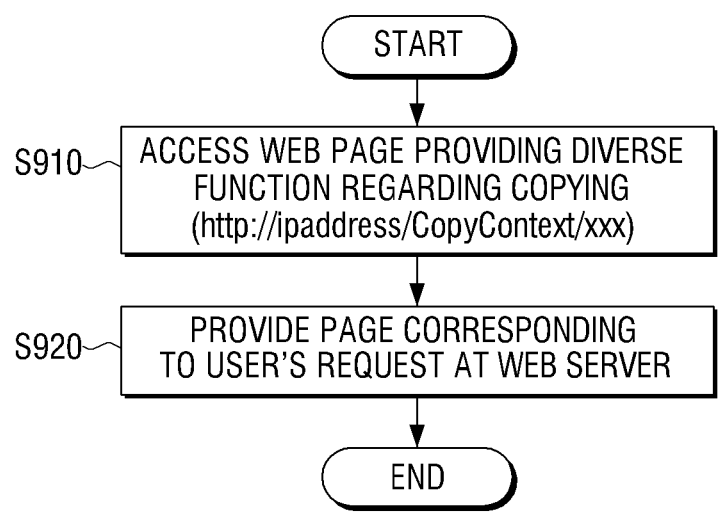
FIG. 9 is a flow chart illustrating a method to display web content desired by the user according to an exemplary embodiment of the present general inventive concept.

FIG. 9 is a flow chart illustrating a method to display web content desired by the user according to an exemplary embodiment of the present general inventive concept.

Referring to FIG. 9, in operation S910, the user may access web content, that is, web pages providing diverse functions regarding copying. In this case, the user may directly access a web page providing diverse functions regarding copying by inputting a URL of, for example, http://ipaddress/CopyContext/xxx using at least one printing control apparatus 200-1, 200-2, . . . , and 200-n without passing through the main page.

In operation S920, the web server 150 may provide the page requested by the user, that is, may respond to the user's request.

Accordingly, the user can directly access a desired web application without passing through the main web application, and the display unit 130 can display web content corresponding to the desired web application. Consequently, the user's convenience can be enhanced.

When the user directly accesses a desired web application without passing through the main web application, more reinforced authentication may be performed.

Figure 10:
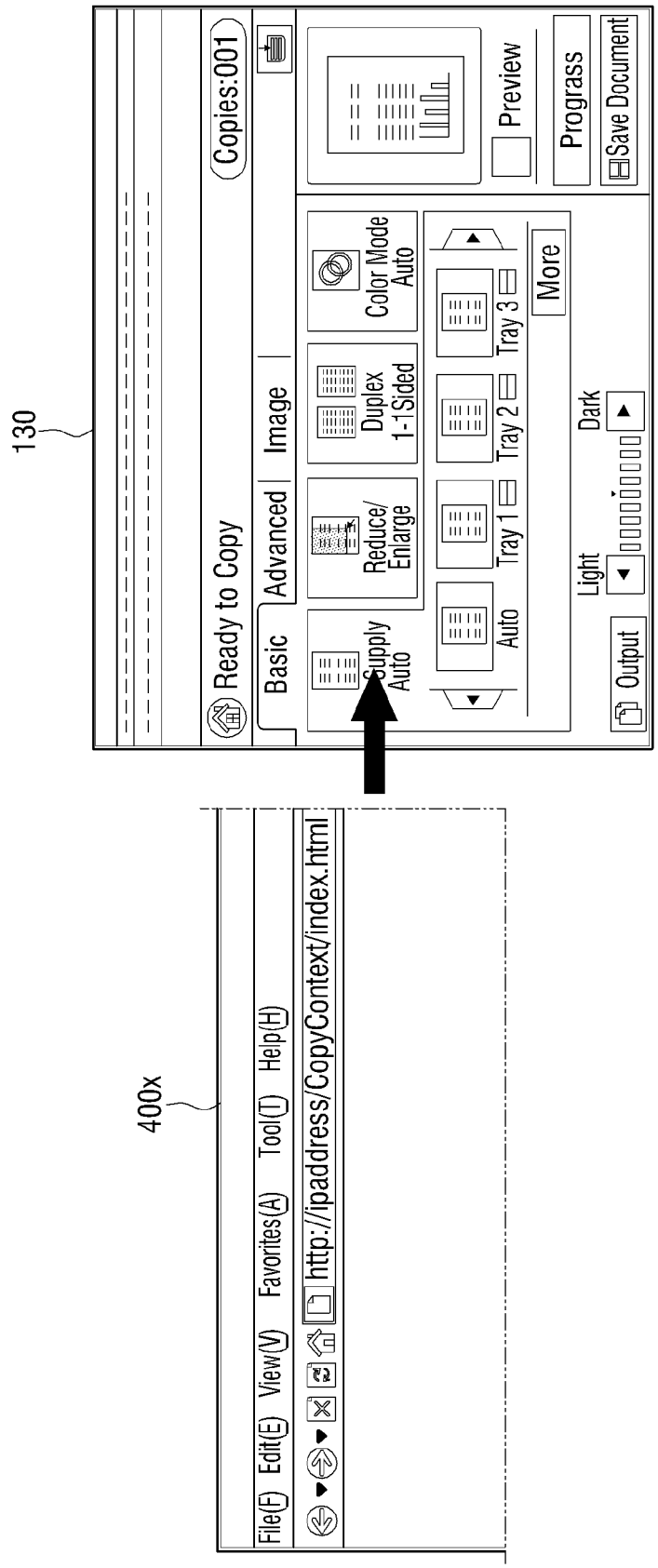
FIG. 10 illustrates the method illustrated in FIG. 9 in greater detail.

FIG. 10 illustrates the method illustrated in FIG. 9 in greater detail.

Referring to FIG. 10, if the user inputs a URL of http://ipaddress/CopyContext/xxx using the web browser 400x of an external host device, a local user interface (LUI) of the image forming apparatus 100, that is, the display unit 130 may display a web page providing diverse functions regarding copying.

In addition, the image forming apparatus 100 may provide the at least one printing control apparatus 200-1, 200-2, . . . , and 200-n with the generated web page so that the generated web page can be displayed on the second display unit (not illustrated) of the printing control apparatus 200.

Accordingly, in a conventional method, the user may access the main web page and then move to the web page providing a copying function, whereas in the method according to the exemplary embodiment of the present general inventive concept, the user can directly access the web page providing a copying function. Accordingly, the user's convenience can be improved.

Figure 11:
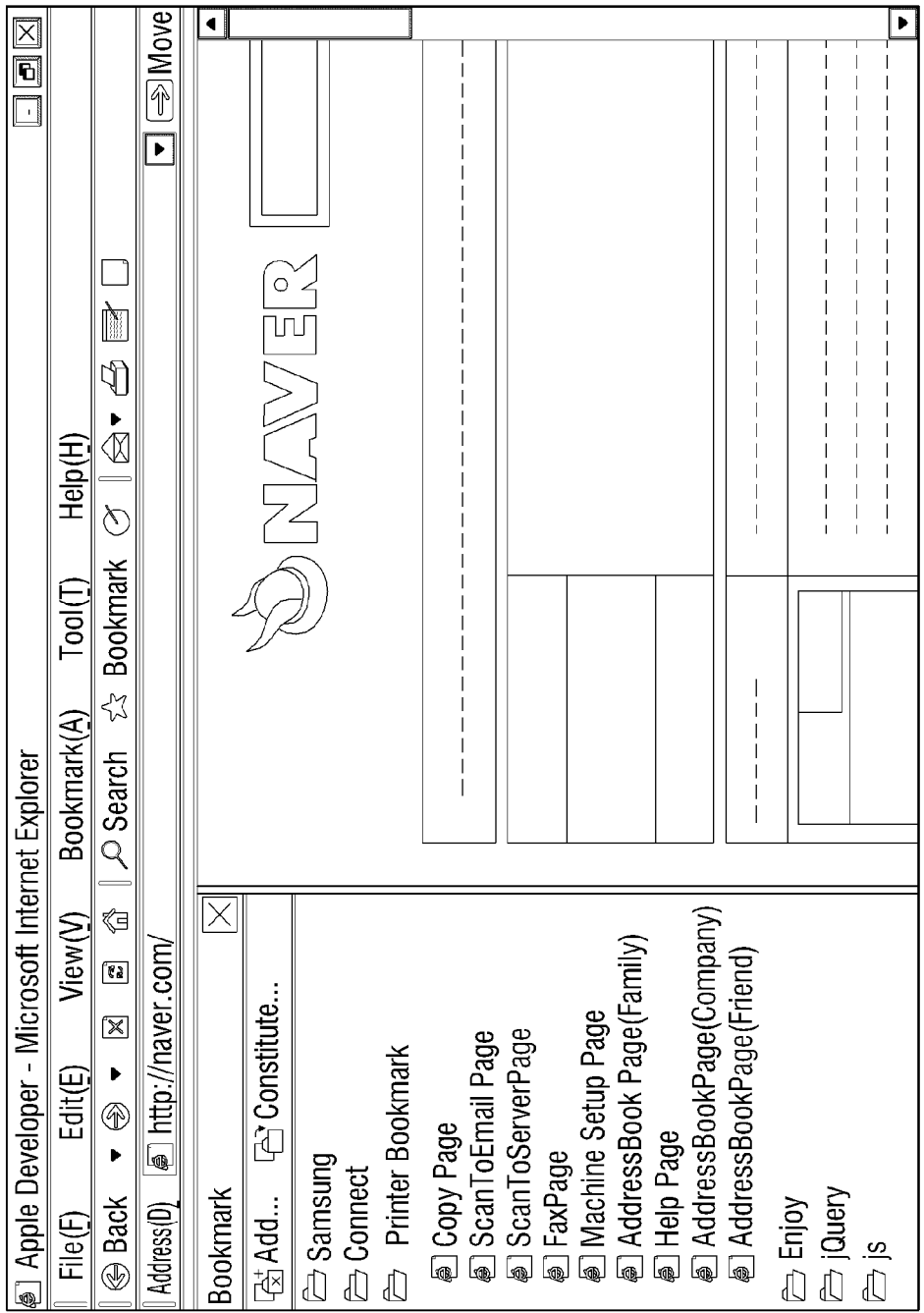
FIG. 11 illustrates a method to receive an access request according to an exemplary embodiment of the present general inventive concept.

FIG. 11 illustrates a method to receive an access request according to an exemplary embodiment of the present general inventive concept. Referring to FIG. 11, the web server 150 of the image forming apparatus 100 may receive a request for access to the main web application or each application from the at least one printing control apparatus 200-1, 200-2, ..., and 200-n.

In this case, the user may access the main web application or each application using a bookmark function of the second display unit (not illustrated) of the at least one printing control apparatus 200-1, 200-2, ..., and 200-n.

As illustrated in FIG. 11, the image forming apparatus 100, which may be frequently used by the user, may be pre-stored as a bookmark in the at least one printing control apparatus 200-1, 200-2, ..., and 200-n, and may be stored in a form corresponding to the web applications on the UI screen of the image forming apparatus 100.

Accordingly, when the user wishes to access a web application providing a copying function, if the user clicks a "Copy page" button, the user can directly access the copy web application without passing through the main web application.

In addition, if the user clicks an "AddressBook Page" button which stores address information such as email information regarding diverse users, the user can directly access the address book web application without passing through the main web application.

In this case, as described above, authentication can be performed using an ID and a password.

Figure 12:
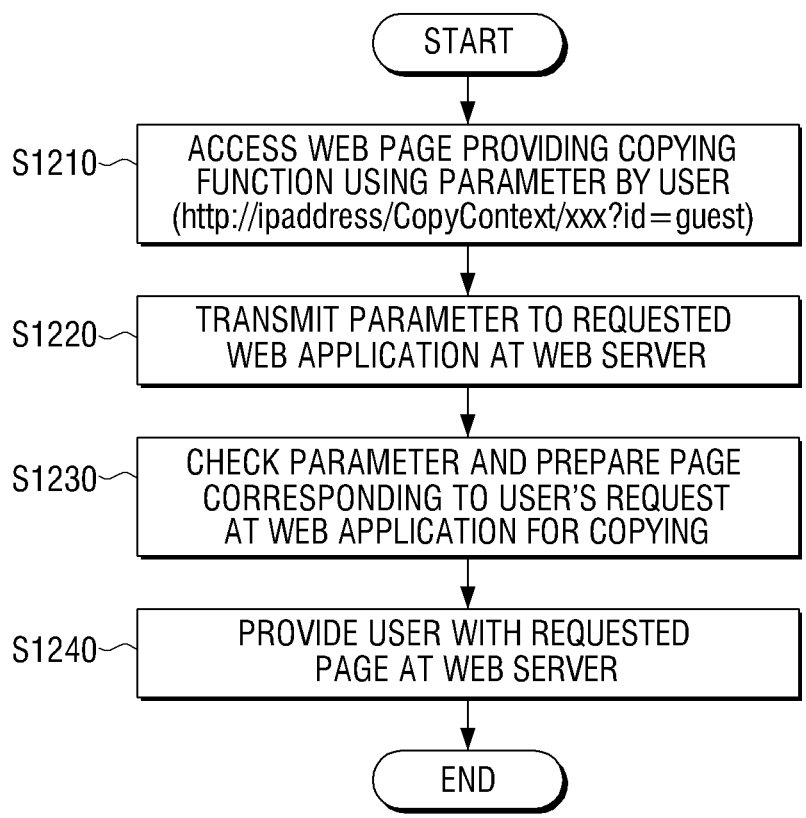
FIG. 12 is a flow chart illustrating a method to display web content of a web application according to another exemplary embodiment of the present general inventive concept.

FIG. 12 is a flow chart illustrating a method to display web content of a web application according to another exemplary embodiment of the present general inventive concept.

Referring to FIG. 12, the user can access a web page providing a copying function using a specific parameter. For example, in the image forming apparatus, a user authentication function may be reinforced, and the maximum number of sheets of paper for copying and accessible types of image forming apparatuses may be set according to the user. Therefore, according to the exemplary embodiment of the present general inventive concept, desired settings can be previously set according to the user.

In the method to display web content of a web application according to an exemplary embodiment of the present general inventive concept, in operation S1210, the user may acess a web page providing a copying function using a parameter. For example, the user may access the web page providing the copying function using a URL and a parameter, such as, for example, http://ipaddress/CopyContext/xxx?id=guest and mode=mono. In this case, the user may access the web page providing the copying function using a parameter set to perform copying in a mono mode so as to perform copying. In addition, diverse copying options, such as N-up and the brightness, can be set.

In operation S1220, the web server may transmit the parameter to the requested web application.

In operation S1230, the web application copying function may check the transmitted parameter and prepare a page corresponding to the user's request. In operation S1240, the web server may provide the user with the requested page.

Consequently, the user can directly access the web page performing the copying function using the printing control apparatus 200, and the display unit 130 can display the web page having an activated mono button in a state that the ID is a "guest."

Accordingly, a web page to provide a specific function can be displayed with detailed items preset, so the user's convenience can be improved.

Figure 13:
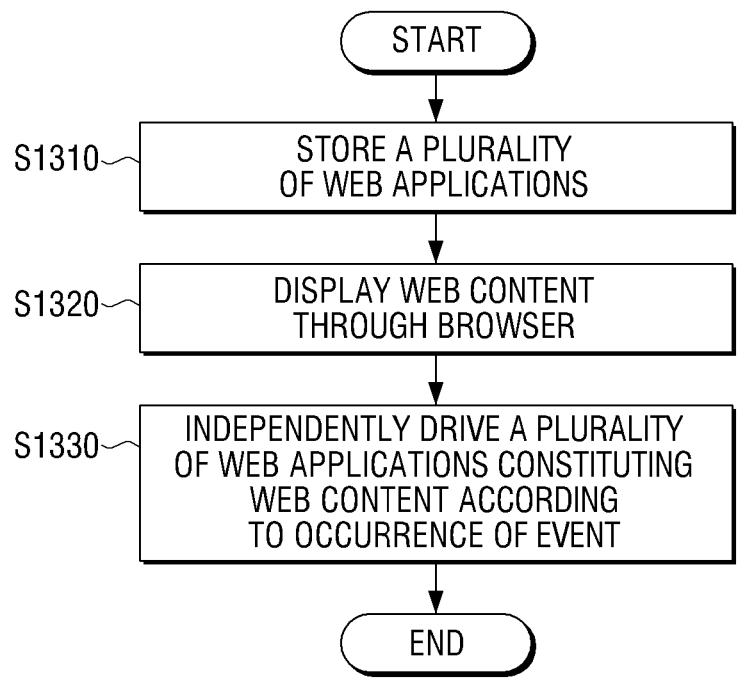
FIG. 13 is a flow chart illustrating a method to provide a local user interface using an image forming apparatus according to an exemplary embodiment of the present general inventive concept.

FIG. 13 is a flow chart illustrating a method to provide a local user interface using an image forming apparatus according to an exemplary embodiment of the present general inventive concept. Referring to FIG. 13, in operation S1310, a plurality of web applications are stored, and in operation S1320, web content may be displayed through a browser.

In operation S1330, the plurality of web applications constituting web content may be independently driven according to occurrence of an event.

An event may occur when a user command is input through a manipulation panel of the image forming apparatus 100 or when the image forming apparatus 100 is powered on.

Since the web content can be displayed using the plurality of web applications, the user can selectively drive a desired web application from among the plurality of web applications and time taken to load web content including at least one web application can be shortened. Further, web content corresponding to a specific web application can be directly loaded and a specific function can be added when web content corresponding to a specific web application is loaded, thus enhancing the usability of the plurality of web applications.

Hereinafter, overlapping description is not repeated for the sake of brevity.

Figure 14:
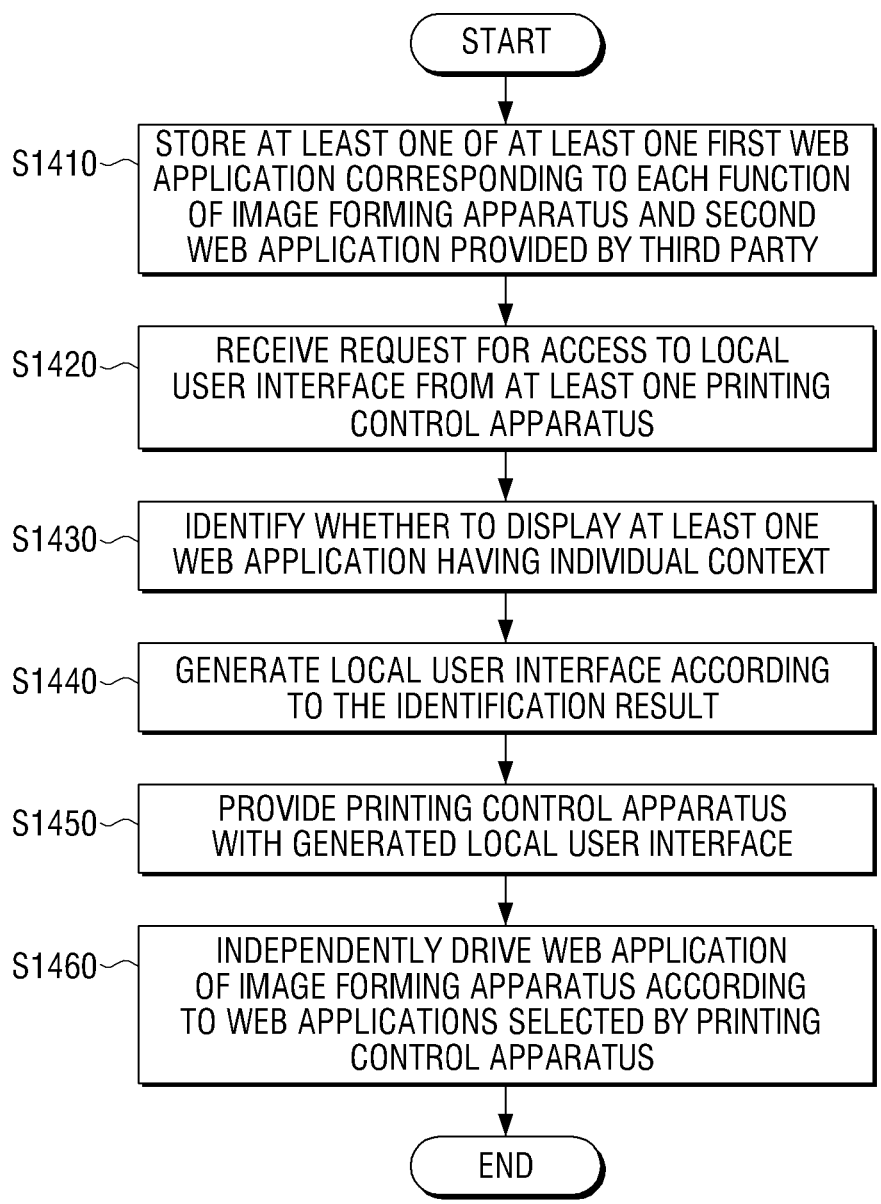
FIG. 14 is a flow chart illustrating a method to provide a local user interface using an image forming apparatus according to another exemplary embodiment of the present general inventive concept.

FIG. 14 is a flow chart illustrating a method to provide a local user interface using an image forming apparatus according to another exemplary embodiment of the present general inventive concept. Referring to FIG. 14, in operation S1410, at least one of a first web application corresponding to each function of the image forming apparatus 100 and a second web application provided by a third party may be stored.

In operation S1420, a request for access to a local user interface may be received from at least one printing control apparatus 200.

Operation S1430 may identify whether to display the at least one web application, and in operation S1440, a local user interface may be generated according to the identification results.

In operation S1450, the generated local user interface may be provided to the printing control apparatus 200.

In operation S1460, a web application of the image forming apparatus may be driven according to a web application selected by the printing control apparatus 200.

The following overlapping description is not repeated.

A method to display web content of an image forming apparatus according to an exemplary embodiment of the present general inventive concept can be implemented using a single processor or chip performing the operations.

Although various exemplary embodiments of the present general inventive concept have been illustrated and described, it will be appreciated by those skilled in the art that changes may be made in these exemplary embodiments without departing from the principles and spirit of the present general inventive concept, the scope of which is defined in the appended claims and their equivalents.

What is claimed is:

1. An image forming apparatus which is connected to at least one printing control apparatus comprising a second display unit implemented as a web browser, the image forming apparatus comprising:
    a first display unit to display each function of web content through a web browser;

a storage unit to store at least one of at least one first web application corresponding to each function of the image forming apparatus and a second web application provided by a third party;

a bundle management unit to identify whether or not the at least one web application can be applied to the image forming apparatus;

a web server to receive a request for access to a local user interface from the at least one printing control apparatus; and a control unit to identify whether to display the at least one web application having an individual context and to generate the local user interface according to the identification by the control unit and the bundle management unit, wherein the web server provides the printing control apparatus with the generated local user interface, and wherein according to a web application selected by the printing control apparatus, the control unit independently drives the web application.

2. The image forming apparatus according to claim 1, wherein the local user interface provided to the second display unit of the printing control apparatus is different from the local user interface provided to the first display unit of the image forming apparatus.

3. The image forming apparatus according to claim 1, wherein the at least one web application has an independent Uniform Resource Locator (URL).

4. The image forming apparatus according to claim 1, wherein the at least one web application comprises:

a web application displaying a copy icon, a web application displaying a scan icon, a web application displaying a fax icon, a web application displaying a universal serial bus (USB) icon, a web application displaying a machine setting icon, a web application displaying a main page including the icons, and a web application provided by a third party.

5. The image forming apparatus according to claim 4, wherein the web application displaying the main page provides link information regarding the at least one web application and displays at least one icon corresponding to the at least one web application.

6. The image forming apparatus according to claim 1, wherein if a URL of one of the at least one web application is input into the web browser of the printing control apparatus, the control unit drives a web application corresponding to the input URL.

7. The image forming apparatus according to claim 1, wherein the request for access comprises:

a URL of the at least one web application or a parameter set to perform a specific function together with the URL.

8. A method to provide a local user interface using an image forming apparatus which comprises a first display unit to display each function of web content through a web browser and to connect at least one printing control apparatus comprising a second display unit implemented as a web browser, the method comprising:

storing at least one of at least one first web application corresponding to each function of the image forming apparatus and a second web application provided by a third party;

receiving a request for access to a local user interface from the at least one printing control apparatus;

identifying whether or not the at least one web application can be applied to the image forming apparatus and whether to display the at least one web application having an individual context;

generating the local user interface according to the identification results;

providing the printing control apparatus with the generated local user interface; and independently driving the web application of the image forming apparatus according to a web application selected by the printing control apparatus.

9. The method according to claim 8, wherein the local user interface provided to the second display unit of the printing control apparatus is different from the local user interface provided to the first display unit of the image forming apparatus.

10. The method according to claim 8, wherein the at least one web application has an independent Uniform Resource Locator (URL).

11. The method according to claim 8, wherein the at least one web application comprises:

a web application displaying a copy icon, a web application displaying a scan icon, a web application displaying a fax icon, a web application displaying a universal serial bus (USB) icon, a web application displaying a machine setting icon, a web application displaying a main page including the icons, and a web application provided by a third party.

12. The method according to claim 11, wherein the web application displaying the main page provides link information regarding the at least one web application and displaying at least one icon corresponding to the at least one web application.

13. The method according to claim 8, wherein during independently driving of the web application of the image forming apparatus, if a URL of one of the at least one web application is input to the web browser of the printing control apparatus, a web application corresponding to the input URL is driven.

14. The method according to claim 8, wherein the request for access comprises:

a URL of the at least one web application or a parameter set to perform a specific function together with the URL.

15. An image forming system comprising:

at least one printing control apparatus including a printing control interactive web display; and an image forming apparatus comprising:

a display unit to display at least one stored network application related to an image forming apparatus function through a web browser;

a network server to receive a request for direct access to the at least one stored network application without passing through a main network application from the at least one printing control apparatus; and a control unit to determine whether to generate the at least one stored network application for the at least one printing control apparatus, such that the network server provides the at least one printing control apparatus with an application capable of displaying the generated at least one stored network application, each network application having a separate function and being independently controlled by the control unit.

16. The image forming apparatus of the image forming system of claim 15, further comprising:

a network interface unit to transmit and receive data from the at least one printing control apparatus; and a storage unit to store the at least one network application.

17. The image forming apparatus of the image forming system of claim 15, further comprising:
   a framework to control enabling or disabling of each network application; and
   a session management unit to control the connection state of the printing control interactive web display.

* * * * *